(12) United States Patent
Kuang

(10) Patent No.: US 8,743,081 B2
(45) Date of Patent: Jun. 3, 2014

(54) CONTROL DEVICE FOR A TOUCH PANEL

(75) Inventor: Yu Kuang, Hinchu (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 135 days.

(21) Appl. No.: 13/207,210

(22) Filed: Aug. 10, 2011

(65) Prior Publication Data

US 2012/0098786 A1  Apr. 26, 2012

(30) Foreign Application Priority Data

Oct. 25, 2010  (TW) .............................. 99136257 A

(51) Int. Cl.
*G06F 3/045* (2006.01)
*G06F 3/041* (2006.01)

(52) U.S. Cl.
USPC .......................................... 345/174; 345/173

(58) Field of Classification Search
None
See application file for complete search history.

(56) References Cited

U.S. PATENT DOCUMENTS

| | | | | |
|---|---|---|---|---|
| 4,723,286 A * | 2/1988 | Kamp | ................................ | 381/3 |
| 6,064,364 A * | 5/2000 | Katoh et al. | .................. | 345/100 |
| 2007/0182719 A1* | 8/2007 | Lee et al. | ........................ | 345/173 |
| 2007/0262966 A1* | 11/2007 | Nishimura et al. | ............ | 345/173 |
| 2008/0042994 A1* | 2/2008 | Gillespie et al. | ............... | 345/174 |
| 2009/0244029 A1* | 10/2009 | Huang et al. | ................... | 345/174 |
| 2011/0156839 A1* | 6/2011 | Martin et al. | ................... | 333/172 |

* cited by examiner

*Primary Examiner* — Alexander Eisen
*Assistant Examiner* — Nan-Ying Yang

(57) ABSTRACT

A touch panel includes a plurality of X-directional sensing lines and a plurality of Y-directional sensing lines. The X-directional sensing lines and the Y-directional sensing lines are arranged in a staggered manner. The control device includes a clock generation circuit, a selection module, a drive signal generation circuit, a digital to analog conversion module, first and second capacitors and a differential detection circuit. The X-directional sensing lines and Y-directional sensing lines on the touch panel operate according to a predetermined scanning sequence. According to the control device and the predetermined scanning sequence of the present invention, the sensing speed of the touch panel can be improved.

11 Claims, 10 Drawing Sheets

| Sensing line \ Scanning sequence | X1 | X2 | X3 | X4 | X5 | X6 | X7 | X8 | X9 | X10 | Y1 | Y2 | Y3 | Y4 | Y5 | Y6 | Y7 | Y8 | Y9 | Y10 |
|---|---|---|---|---|---|---|---|---|---|---|---|---|---|---|---|---|---|---|---|---|
| 1 | $V_1$ | DRV | $V_2$ | DRV | DRV | DRV | DRV | DRV | DRV | DRV | DRV | DRV | DRV | DRV | DRV | DRV | DRV | DRV | DRV | DRV |
| 2 | DRV | $V_1$ | DRV | $V_2$ | DRV | DRV | DRV | DRV | DRV | DRV | DRV | DRV | DRV | DRV | DRV | DRV | DRV | DRV | DRV | DRV |
| 3 | DRV | DRV | $V_1$ | DRV | $V_2$ | DRV | DRV | DRV | DRV | DRV | DRV | DRV | DRV | DRV | DRV | DRV | DRV | DRV | DRV | DRV |
| 4 | DRV | DRV | DRV | $V_1$ | DRV | $V_2$ | DRV | DRV | DRV | DRV | DRV | DRV | DRV | DRV | DRV | DRV | DRV | DRV | DRV | DRV |
| 5 | DRV | DRV | DRV | DRV | $V_1$ | DRV | $V_2$ | DRV | DRV | DRV | DRV | DRV | DRV | DRV | DRV | DRV | DRV | DRV | DRV | DRV |
| 6 | DRV | DRV | DRV | DRV | DRV | $V_1$ | DRV | $V_2$ | DRV | DRV | DRV | DRV | DRV | DRV | DRV | DRV | DRV | DRV | DRV | DRV |
| 7 | DRV | DRV | DRV | DRV | DRV | DRV | $V_1$ | DRV | $V_2$ | DRV | DRV | DRV | DRV | DRV | DRV | DRV | DRV | DRV | DRV | DRV |
| 8 | DRV | DRV | DRV | DRV | DRV | DRV | DRV | $V_1$ | DRV | $V_2$ | DRV | DRV | DRV | DRV | DRV | DRV | DRV | DRV | DRV | DRV |
| 9 | DRV | DRV | DRV | DRV | DRV | DRV | DRV | DRV | $V_1$ | DRV | $V_2$ | DRV | DRV | DRV | DRV | DRV | DRV | DRV | DRV | DRV |
| 10 | DRV | DRV | DRV | DRV | DRV | DRV | DRV | DRV | DRV | $V_1$ | DRV | $V_2$ | DRV | DRV | DRV | DRV | DRV | DRV | DRV | DRV |
| 11 | DRV | DRV | DRV | DRV | DRV | DRV | DRV | DRV | DRV | DRV | $V_1$ | DRV | $V_2$ | DRV | DRV | DRV | DRV | DRV | DRV | DRV |
| 12 | DRV | DRV | DRV | DRV | DRV | DRV | DRV | DRV | DRV | DRV | DRV | $V_1$ | DRV | $V_2$ | DRV | DRV | DRV | DRV | DRV | DRV |
| 13 | DRV | DRV | DRV | DRV | DRV | DRV | DRV | DRV | DRV | DRV | DRV | DRV | $V_1$ | DRV | $V_2$ | DRV | DRV | DRV | DRV | DRV |
| 14 | DRV | DRV | DRV | DRV | DRV | DRV | DRV | DRV | DRV | DRV | DRV | DRV | DRV | $V_1$ | DRV | $V_2$ | DRV | DRV | DRV | DRV |
| 15 | DRV | DRV | DRV | DRV | DRV | DRV | DRV | DRV | DRV | DRV | DRV | DRV | DRV | DRV | $V_1$ | DRV | $V_2$ | DRV | DRV | DRV |
| 16 | DRV | DRV | DRV | DRV | DRV | DRV | DRV | DRV | DRV | DRV | DRV | DRV | DRV | DRV | DRV | $V_1$ | DRV | $V_2$ | DRV | DRV |

CONTROL DEVICE FOR A TOUCH PANEL

BACKGROUND OF THE INVENTION

1. Field of the Invention

The present invention relates to a control device applicable to a touch panel.

2. Description of the Related Art

Touch panels are widely applied in a variety of fields such as home appliances, communication devices and electronic information devices. The touch panel is often applied in input interfaces of personal digital to assistants (PDAs), electronic products and game consoles. The current trend of integrating a touch panel and a display allows a user to select an icon displayed on the panel by using a finger or a touch pen, so that the PDA, the electric product, or the game console executes a desired function. The touch panel may also be applied in a public information inquiry system, so that the user can operate the system more efficiently.

In order to effectively detect a correct position at which the user touches the panel, multiple technologies of the touch panel have been developed. For example, the touch panel may be designed as a capacitive touch panel, which is based on the positioning principle of judging a touch position according to a change of capacitance of a sensing grid embedded in the touch panel. In addition to the capacitive touch panel, other touch panels based on different sensing principles include resistive touch panels, optical touch panels and surface acoustic wave touch screen panels.

FIG. 1 is a schematic view of a conventional touch panel 10. The touch panel 10 includes a plurality of X-directional sensing lines X1 to Xm, and a plurality of Y-directional sensing lines Y1 to Yn, where m and n are same or different positive integers. The X-directional sensing lines X1 to Xm and the Y-directional sensing lines Y1 to Yn are embedded in different layers of the touch panel 10. Referring to FIG. 1, the X-directional sensing lines X1 to Xm and the Y-directional sensing lines Y1 to Yn are arranged in a staggered manner, thereby forming a sensing grid. In the sensing grid, a plurality of mutual capacitors (not shown) are formed between every X-directional sensing line and every Y-directional sensing line, and a number of parasitic capacitors (not shown) are formed between every X-directional sensing line and the ground.

During operation, a drive signal (usually a square-wave signal) is input to the X-directional sensing lines or the Y-directional sensing lines. As a result of a coupling effect of the mutual capacitors, a plurality of induced voltages are generated on corresponding Y-directional sensing lines or X-directional sensing lines. As values of the induced voltages change while a user touches the sensing lines, a position touched by the user can be acquired by detecting differences between the induced voltages.

However, due to the resistance of the sensing lines and the parasitic capacitors in the touch panel, the induced voltages can only become stable and measurable after a time delay. The time delay severely affects an operating frequency of the drive signal and a detection time of the induced voltages, and the problem becomes more serious as the size of the touch panel increases. Therefore, it is necessary to provide a control device applicable to a touch panel to meet requirements of the industry.

SUMMARY OF THE INVENTION

The present invention discloses a control device for a touch panel. The touch panel includes a plurality of first direction sensing lines and a plurality of second direction sensing lines, and the first direction sensing lines and the second direction sensing lines are arranged in a staggered manner. The control device includes a clock generation circuit, a selection module, a drive signal generation circuit, a digital to analog conversion module, a first capacitor, a second capacitor, and a differential detection circuit.

According to an embodiment of the present invention, the clock generation circuit generates a first clock signal and a third clock signal according to a reference clock signal. A frequency of the first clock signal associates with a frequency of the reference clock signal, a frequency of the third clock signal equals half the frequency of the reference clock signal, and a phase of the third clock signal is ahead of the phase of the first clock signal. The selection module selects sensing lines to be measured from the first direction sensing lines or the second direction sensing lines according to a predetermined scanning sequence, and generates a first voltage and a second voltage according to the first clock signal. The drive signal generation circuit generates a drive signal according to the reference clock signal, and the drive signal is applied to sensing lines other than the sensing lines to be measured. The drive signal has a first drive voltage level, $V_{1D}$, and a second drive voltage level, $V_{2D}$, and a frequency of the drive signal is half the frequency of the reference clock signal. The digital to analog conversion module selectively generates a third voltage, $V_3$, or a fourth voltage, $V_4$, according to a comparison signal, the first clock signal and the third clock signal. The first capacitor is coupled between the selection module and a differential detection circuit. Two parallel surfaces of the first capacitor subject to two voltage levels, $V_1$ and $V_3$, respectively. Therefore, the first capacitor is configured to manifest a variation of the third voltage $V_3$ on the first voltage $V_1$. The second capacitor is coupled between the selection module and the differential detection circuit. Two parallel surfaces of the second capacitor subject to two voltage levels, $V_2$ and $V_4$, respectively. Therefore, the second capacitor is configured to manifest a variation of the fourth voltage $V_4$ on the second voltage $V_2$. The differential detection circuit detects the first and second voltages to generate the comparison signal. According to an embodiment of the present invention, the predetermined scanning sequence includes a first scan and a second scan following the first scan. During the first scan, the selection module selects a first sensing line and a second sensing line to be connected to the first and second capacitors. Next, during the second scan, the selection module selects a third sensing line and a fourth sensing line to be connected to the first and second capacitors. The first, second, third and fourth sensing lines are arranged in sequence. Alternatively, the first and third sensing lines are arranged alternately, the second and fourth sensing lines are arranged alternately, and the second sensing line is adjacent to the first sensing line.

BRIEF DESCRIPTION OF THE DRAWINGS

The invention will be described according to the appended drawings in which:

FIG. 7 is a predetermined scanning sequence according to an embodiment of the present invention;

FIG. 8 is another predetermined scanning sequence according to another embodiment of the present invention;

DETAILED DESCRIPTION OF THE INVENTION

Figure 1:
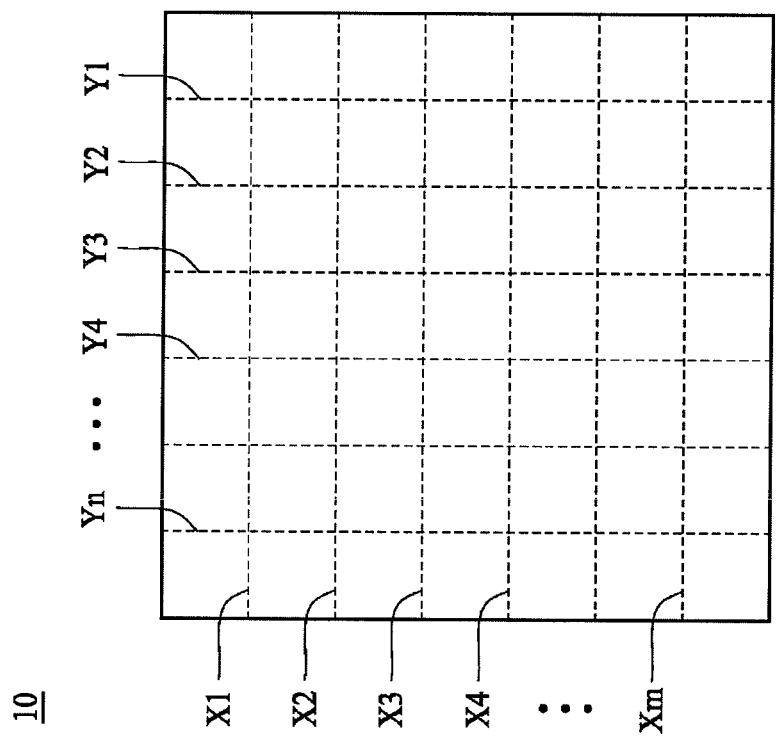
FIG. 1 is a schematic view of a conventional touch panel.
Figure 2:
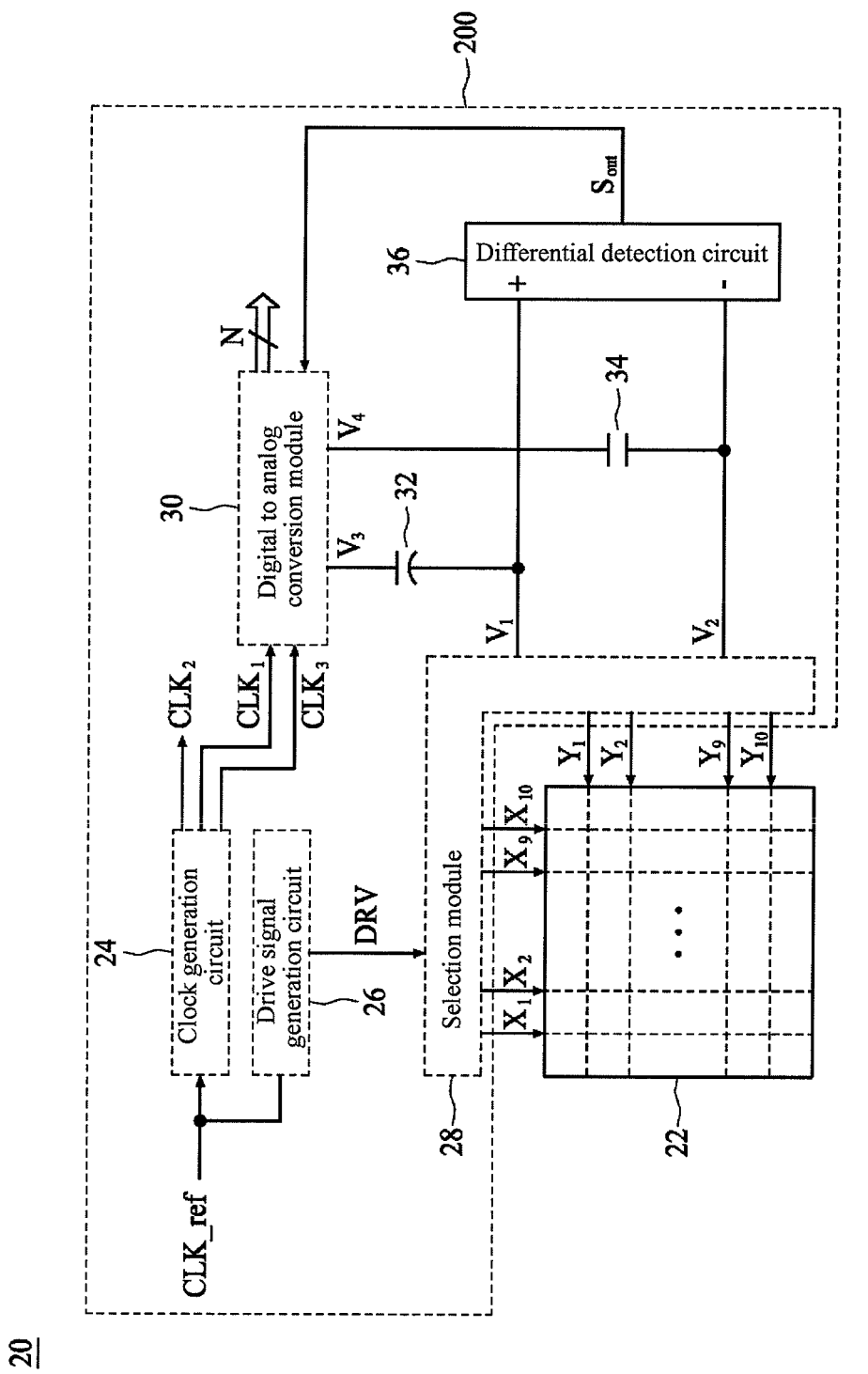
FIG. 2 is a schematic block diagram of a touch input device according to an embodiment of the present invention.

FIG. 2 is a schematic block diagram of a touch input device 20 according to an embodiment of the present invention. The touch input device 20 includes a touch panel 22 and a control device 200. The control device 200 is used to detect a touch state of the touch panel 22. The touch panel 22 includes a plurality of X-directional sensing lines $X_1$ to $X_{10}$, and a plurality of Y-directional sensing lines $Y_1$ to $Y_{10}$. The X-directional sensing lines $X_1$ to $X_{10}$ and the Y-directional sensing lines $Y_1$ to $Y_{10}$ are embedded in different layers of the touch panel 22. Referring to FIG. 2, the X-directional sensing lines $X_1$ to $X_{10}$ and the Y-directional sensing lines $Y_1$ to $Y_{10}$ are arranged in a staggered manner, thereby forming, but not limited to forming, a check-shaped grid. In the check-shaped grid, a plurality of mutual capacitors (not shown) are formed between every X-directional sensing line and every Y-directional sensing line.

The control device 200 includes a clock generation circuit 24, a drive signal generation circuit 26, a selection module 28, a digital to analog conversion module 30, capacitors 32 and 34 and a differential detection circuit 36. The clock generation circuit 24 generates a clock signal $CLK_1$ and a clock signal $CLK_3$ to the digital to analog conversion module 30 according to a rising edge of a reference clock signal CLK_ref. A frequency of the clock signal $CLK_3$ is half the frequency of the reference clock signal CLK_ref, and a phase of the clock signal $CLK_3$ is slightly ahead of the clock signal $CLK_1$. The drive signal generation circuit 26 generates a drive signal DRV to the touch panel 22 according to a falling edge of the reference clock signal CLK_ref. A frequency of the drive signal DRV is half the frequency of the reference clock signal CLK_ref. The selection module 28 selects sensing lines to be measured from the X-directional sensing lines $X_1$ to $X_{10}$ and the Y-directional sensing lines $Y_1$ to $Y_{10}$ according to a predetermined scanning sequence, and the selection module generates a voltage $V_1$ and a voltage $V_2$ to the differential detection circuit 36 according to the first clock signal $CLK_1$.

The differential detection circuit 36 may be, but is not limited to, a voltage comparator. The differential detection circuit 36 detects the voltages $V_1$ and $V_2$ to generate a comparison signal $S_{out}$. The digital to analog conversion module 30 selectively generates a voltage $V_3$ or a voltage $V_4$ to the capacitors 32 and 34 according to the comparison signal $S_{out}$. Two parallel surfaces of the first capacitor 32 subject to two voltage levels, $V_1$ and $V_3$, respectively; two parallel surfaces of the second capacitor 34 subject to two voltage levels, $V_2$ and $V_4$, respectively. A variation of the voltage $V_3$ or the voltage $V_4$ is manifested by the capacitors 32 and 34 on the voltages $V_1$ and $V_2$.

Figure 3:
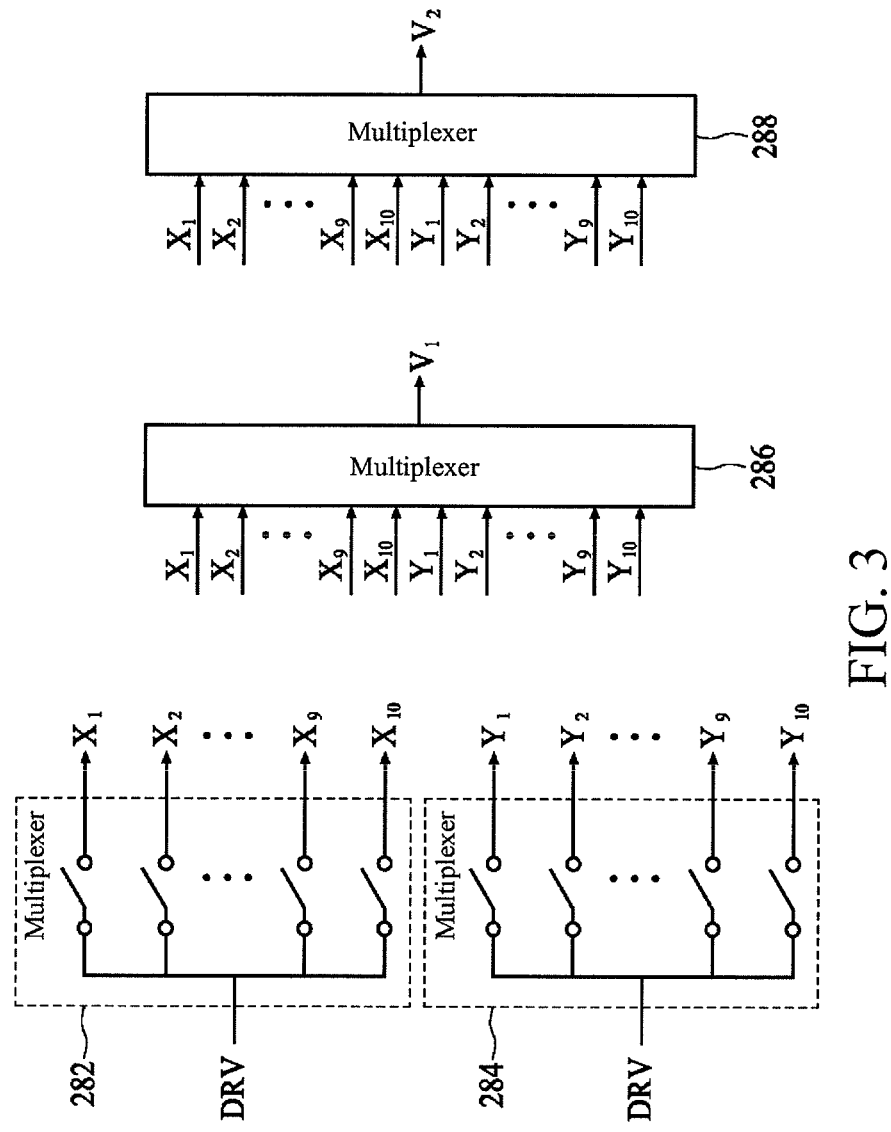
FIG. 3 is a schematic detailed circuit diagram of the selection module according to an embodiment of the present invention.

FIG. 3 is a schematic detailed circuit diagram of the selection module 28 according to an embodiment of the present invention. Referring to FIG. 3, the selection module 28 includes multiple multiplexers 282 to 288. The multiplexers 282 and 284 are coupled between the drive signal generation circuit 26 and the touch panel 22, and the multiplexers 286 and 288 are coupled between the touch panel 22 and the differential detection circuit 36.

Figure 4:
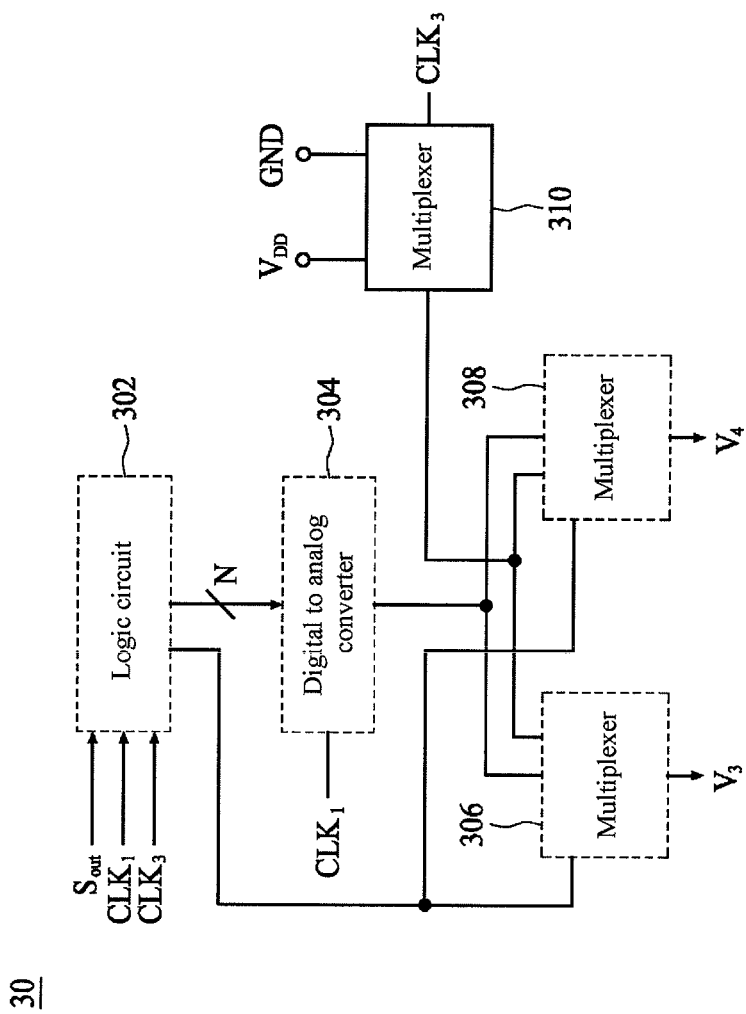
FIG. 4 is a schematic detailed circuit diagram of the digital to analog conversion module according to an embodiment of the present invention.

FIG. 4 is a schematic detailed circuit diagram of the digital to analog conversion module 30 according to an embodiment of the present invention. The digital to analog conversion module 30 includes a logic circuit 302, a digital to analog converter 304 and multiple multiplexers 306 to 310. Referring to FIG. 4, the logic circuit 302 receives the comparison signal $S_{out}$ to output the N-bit signal to the digital to analog converter 304 in sequence. The multiplexer 310 selectively outputs a power supply voltage $V_{DD}$ or a ground voltage GND to the multiplexers 306 and 308 according to the clock signal $CLK_3$. The multiplexers 306 and 308 are coupled to the digital to analog converter 304, which outputs the voltage $V_3$ or the voltage $V_4$ to the capacitors 32 and 34 according to the comparison signal $S_{out}$ and the clock signal $CLK_1$.

Figure 5:
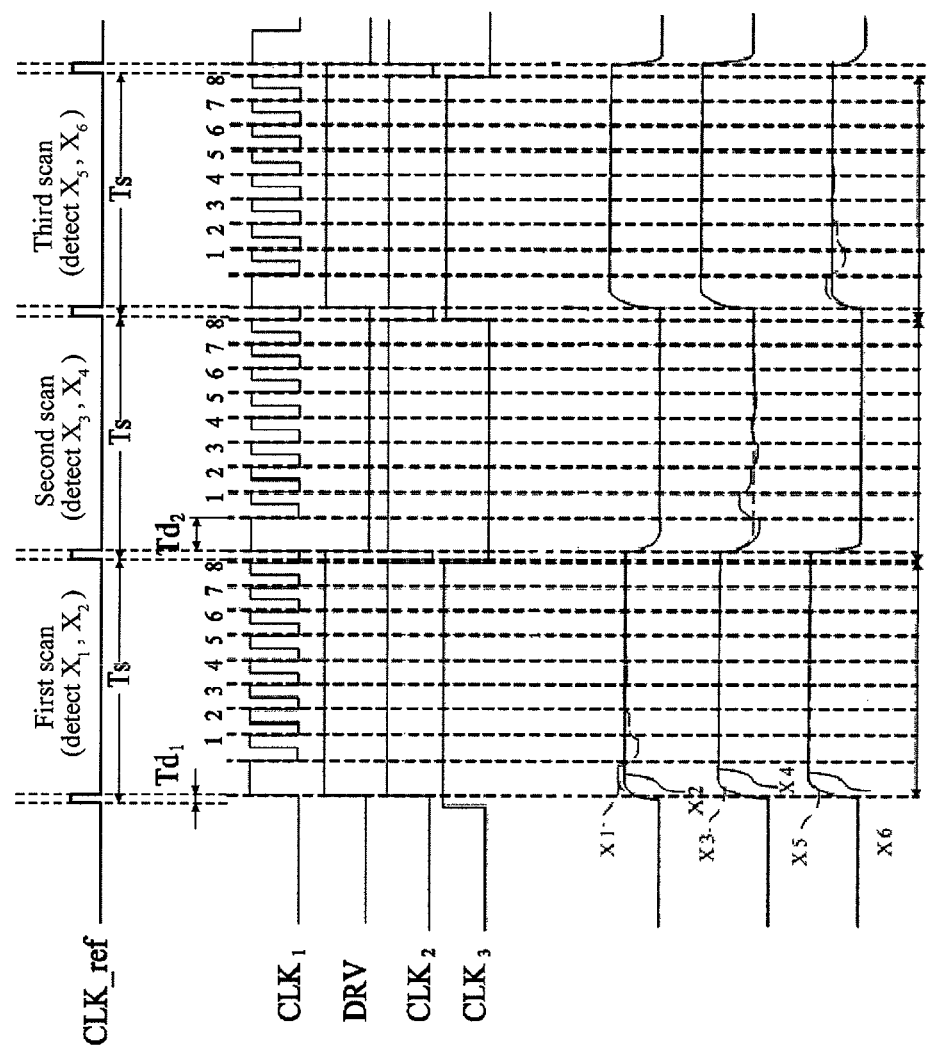
FIG. 5 is an oscillogram of a touch input device according to an embodiment of the present invention.
Figure 7:
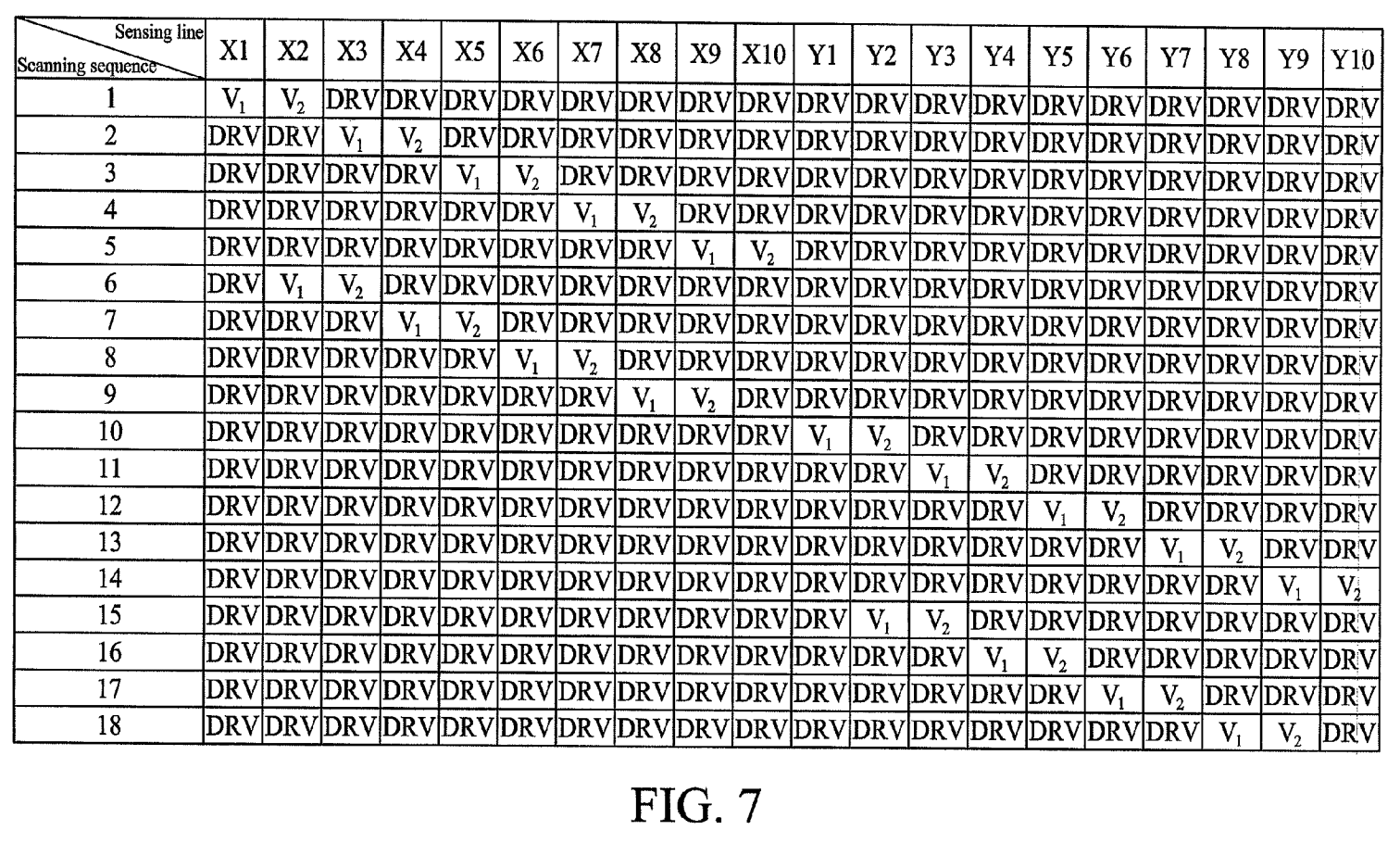

FIG. 5 shows an oscillogram of the touch input device 20 according to an embodiment of the present invention. Referring to FIG. 5, the clock signal $CLK_1$ has a fixed time interval Ts, and each time interval Ts includes a first time duration $Td_1$, a second time duration $Td_2$, and continuous pulses following the first time duration $Td_1$ and the second time duration $Td_2$. In an embodiment of the present invention, the continuous pulses comprise eight pulses. The touch input device 20 operates according to a predetermined scanning sequence, the clock signal $CLK_1$, a clock signal $CLK_2$, the clock signal $CLK_3$, and the drive signal DRV. FIG. 7 shows a predetermined scanning sequence according to an embodiment of the present invention. In the example of FIG. 7, the number of sensing lines to be measured is set to be 2, and the sensing lines X1 and X2 of the X-directional sensing lines are set as an initial measurement channel Referring to FIG. 7, during the first scan, a driving signal DRV is output to other sensing lines excluding the sensing lines X1 and X2 through the multiplexers 282 and 284. During the first scan, a voltage on the sensing line X1 may be selected by the multiplexers 286 to generate the voltage V1. Meanwhile, a voltage on the sensing line X2 may be selected by the multiplexers 288 to generate the voltage V2. The differential detection circuit 36 may detect a difference between the two voltages V1 and V2 selected by the multiplexers 286 and 288 to generate a touch sensing signal Sout.

Next, during the second scan, the initial measurement channel shifts to the right to form a new measurement channel, that is, the sensing lines X3 and X4. Therefore, the drive signal generation circuit 26 outputs the driving signal DRV to other sensing lines excluding the sensing lines X3 and X4 through the multiplexers 282 and 284. During the second scan, a voltage on the sensing line X3 may be selected by the multiplex selector 286 to generate the voltage V1. Meanwhile, a voltage on the sensing line X4 may be selected by the multiplex selector 288 to generate the voltage V2. The differential detection circuit 36 generates the touch sensing signal Sout according to the two received voltage V1 and V2 at the two input ends.

Similarly, in other scanning sequences, the measurement channel shifts to the right in sequence. The driving signal DRV is input into the sensing lines excluding the measurement channel. Under a coupling effect of the mutual capacitor, the driving signal DRV is coupled to nodes of the measurement channel. If a user touches the nodes, a capacitance value of the mutual capacitor changes, thereby causing the voltage to change. By detecting the change of the voltages, a touched position on the touch panel 22 can be acquired. In the present embodiment, a previous state of the measurement channel set each time is always a driven state. Therefore, during each scan, initial voltage values of the nodes of the measurement channel are the same (all in the driven low or high state), and we can alternately use a rising and falling edge of driving signal DRV as the stimulus of charge transfer from driving line to measurement channel and FIG. 8 shows another predetermined scanning sequence according to an embodiment of the present invention. A plurality of sensing lines of an initial measurement channel may be set to be arranged alternately, as shown in FIG. 8. Referring to FIG. 8, the sensing line X2 is between the sensing lines X1 and X3, and sensing lines X1 and X3 are set as initial measurement channels. When the driving panel performs the first scan, the sensing lines X2 and X4 are in the driven state. When the driving panel the second scan, the sensing lines X2 and X4 are set as the measurement channel. Due to the previous states of the measurement channels are the same (all in the driven low or high state), an initial voltage values on the measurement channels are the same, and we can alternately use a rising and falling edge of driving signal DRV as the stimulus of charge transfer from driving line to measurement channel. The scanning sequence is described in further detail in a preceding application titled 'TOUCH INPUT DEVICE AND SCANNING METHOD THEREOF' (U.S. patent application Ser. No. 13/207,047, which claims priority to Taiwan Application No. 099127043, filed on Aug. 13, 2010, the contents of both of which are hereby incorporated by reference). A working manner of the touch input device 20 is described below according to the oscillogram of FIG. 5 and the scanning sequences of FIG. 7 and FIG. 8.

Figure 9:
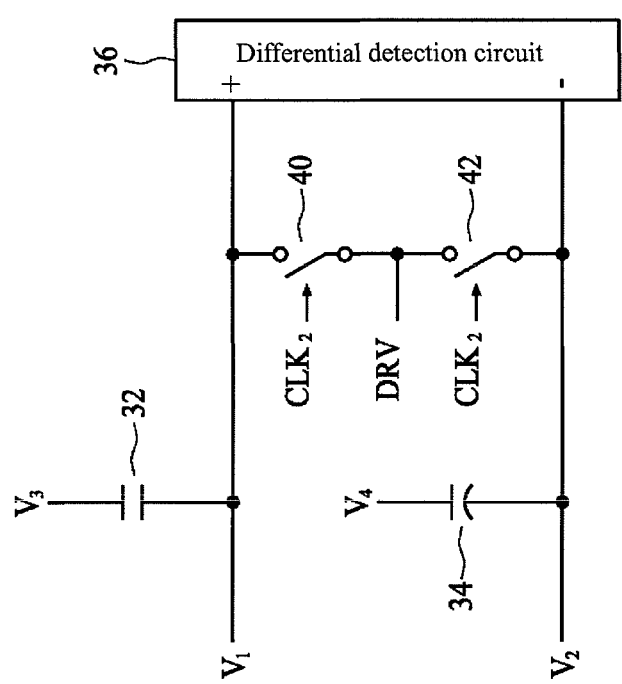
FIG. 9 is a reset circuit according to an embodiment of the present invention.
Figure 10:
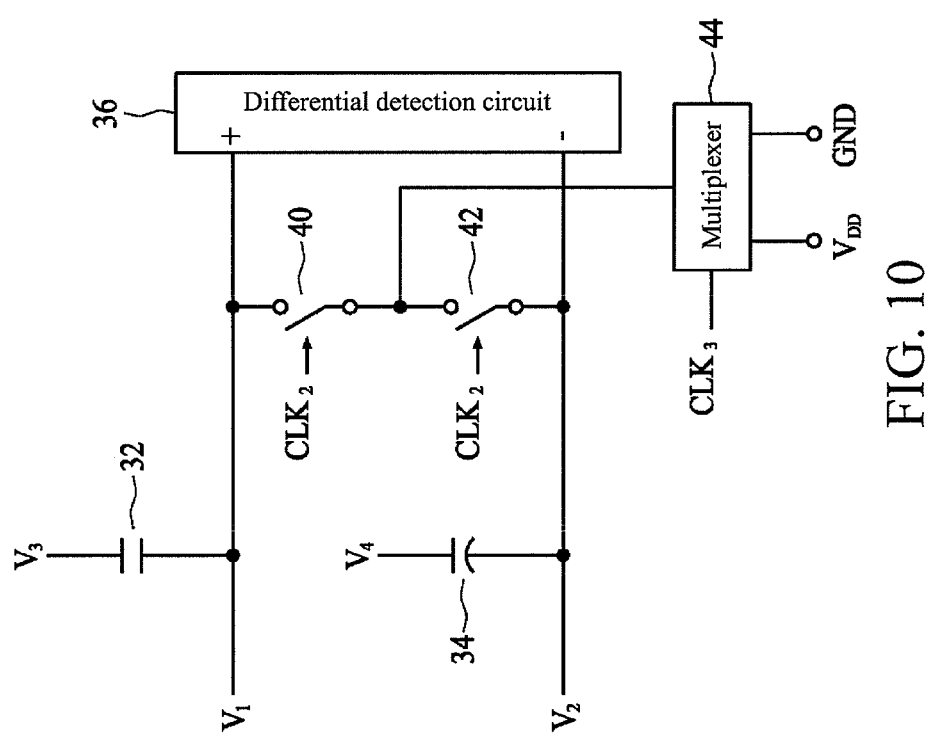
FIG. 10 is a reset circuit according to another embodiment of the present invention.

In an embodiment of the present invention, during a first scan, a positive input voltage and a negative input voltage of the differential detection circuit 36 are first reset to a predetermined voltage during the first time duration $Td_1$. Referring to FIG. 9, when the clock signal $CLK_2$ is at a low logic level, switches 40 and 42 are turned on, so that the positive input voltage and the negative input voltage of the differential detection circuit 36 are reset to a drive voltage DRV. Referring to FIG. 5, the clock signal $CLK_2$ generates a low logic signal during the first duration $Td_1$. Alternatively, referring to FIG. 10, the positive input voltage and the negative input voltage of the differential detection circuit 36 are selectively reset to the power supply voltage $V_{DD}$ or the ground voltage GND by a multiplexer 44. The logic level of the clock signal $CLK_3$ dictates the selection result of the multiplexer 44. During the first scan, according to the predetermined scanning sequence shown in FIG. 5, the selection module 28 selects the sensing lines $X_1$ and $X_2$ as initial measurement channels. Therefore, the drive signal DRV is coupled to sensing lines other than the sensing lines $X_1$ and $X_2$ through the multiplexers 282 and 284, and voltages on the sensing lines $X_1$ and $X_2$ are output to the capacitors 32 and 34 through the multiplexers 286 and 288, respectively. The voltages on the sensing lines $X_1$ and $X_2$ reach a steady voltage during the second time duration $Td_2$ of the clock signal $CLK_1$. A length of the second time duration $Td_2$ is determined by an RC time delay of the touch panel 22. The possible factors affecting the RC time delay are sensing lines' resistance and parasitic capacitance in the touch panel.

In addition, during the first time duration $Td_1$ and the second time duration $Td_2$, the voltages $V_3$ and $V_4$ are determined by the multiplexer 310. In the present embodiment, the clock signal $CLK_3$ is at a high logic level in this case, so that the voltages $V_3$ and $V_4$ are set to equal the power supply voltage $V_{DD}$. During the first time duration $Td_1$ and the second time duration $Td_2$, the drive signal DRV transforms from a first drive voltage level (the ground voltage in the example) to a second drive voltage level (the power supply voltage $V_{DD}$ in the example). The differential detection circuit 36 generates and outputs the comparison signal $S_{out}$ after comparing the voltages $V_1$ and $V_2$ during the second time duration $Td_2$. The clock signal $CLK_3$ is at the high logic level, so that the logic circuit 302 latches the comparison signal $S_{out}$ when the second time duration $Td_2$ ends. For example, if the sensing line $X_2$ is touched or having a large touched area, but the sensing line $X_1$ is not touched or having a small touched area, the logic circuit 302 latches a high logic level. The digital to analog converter 304 outputs a voltage lower than the power supply voltage $V_{DD}$ according to the high logic level, and the multiplexer 306 is enabled according to the high logic level. The capacitor 32 manifests the decreased voltage on the voltage $V_1$, so that the differential detection circuit 36 updates the comparison signal $S_{out}$ during the continuous pulse period. The logic circuit 302 includes a Successive Approximation Register (SAR), which controls output of the digital to analog converter 304 bit by bit according to a binary search algorithm. The operation of the digital to analog conversion module 30 during the continuous pulse period is described in further detail in a preceding application titled "TOUCH INPUT ELECTRONIC DEVICE" (U.S. application Ser. No. 13/033,661, filed on Feb. 24, 2011).

Referring to FIG. 5 and FIG. 9, during a second scan, when the clock signal $CLK_2$ is at a low logic level during the first time duration $Td_1$, the positive input voltage and the negative input voltage of the differential detection circuit 36 are reset to the drive voltage DRV. According to the predetermined scanning sequence shown in FIG. 5, the selection module 28 selects the sensing lines $X_3$ and $X_4$ as initial measurement channels. Therefore, the drive signal DRV is coupled to sensing lines other than the sensing lines $X_3$ and $X_4$ through the multiplexers 282 and 284, and voltages on the sensing lines $X_3$ and $X_4$ are output to the capacitors 32 and 34 through the multiplexers 286 and 288, respectively.

During the first time duration $Td_1$ and the second time duration $Td_2$ of the second scan, the clock signal $CLK_3$ is at the low logic level, so that the voltages $V_3$ and $V_4$ are set to equal the ground voltage GND. During the first time duration $Td_1$ and the second time duration $Td_2$, the drive signal DRV transforms from the second drive voltage level to the first drive voltage level. The differential detection circuit 36 compares the voltages on the sensing lines $X_3$ and $X_4$ during the second time duration $Td_2$ to generate the output signal $S_{out}$. The clock signal $CLK_3$ is at the low logic level, so that the logic circuit 302 latches a signal complementary to the comparison signal $S_{out}$ when the second time duration $Td_2$ ends. For example, if the sensing line $X_3$ is touched or having a larger touched area, but the sensing line $X_4$ is not touched or having a smaller touched area, the logic circuit 302 latches a low logic level. The digital to analog converter 304 outputs a voltage higher than the ground voltage GND according to the low logic level, and the multiplexer 308 outputs an analog signal of the digital to analog converter to the capacitor 34 according to the low logic level. The capacitor 34 manifests the voltage increase on the voltage $V_2$, so that the differential detection circuit 36 updates the comparison signal $S_{out}$ during the continuous pulse period. Accordingly, during the second time duration $Td_2$ and the continuous pulse period of the clock signal $CLK_1$, the digital to analog conversion module 30 completes an N-bit signal output.

Figure 6:
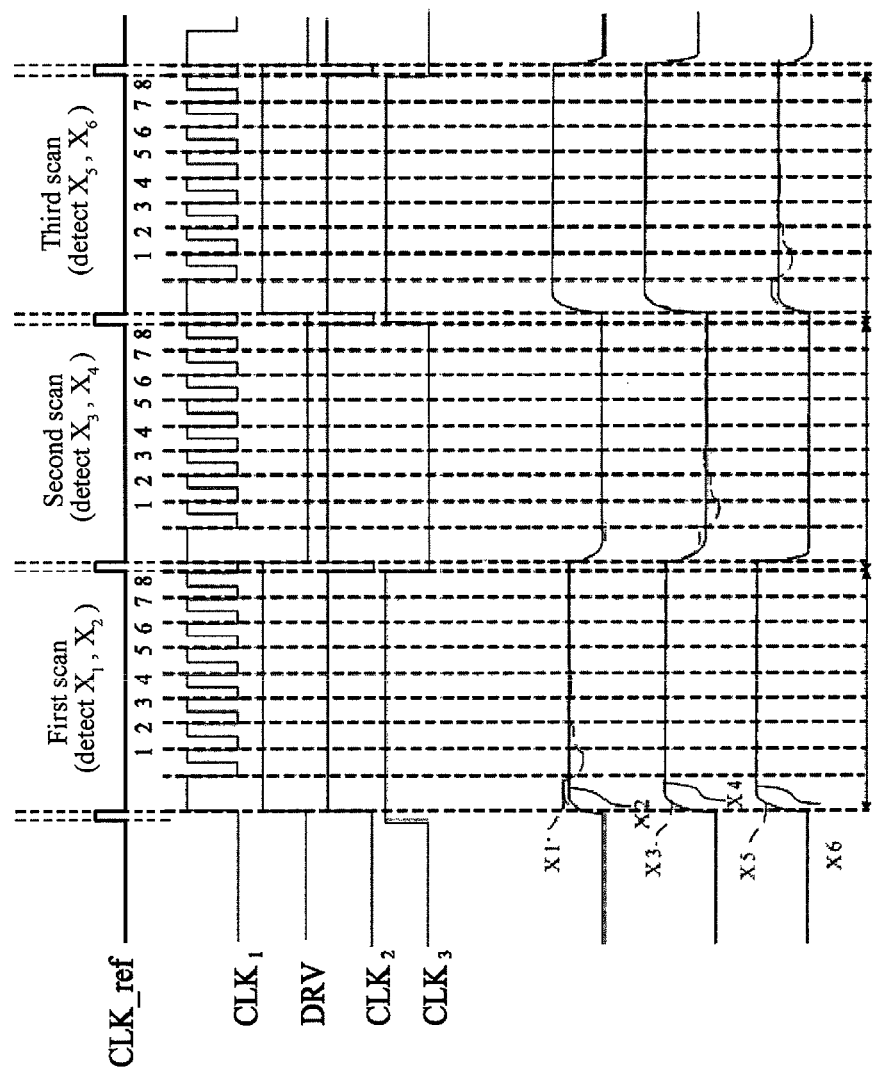
FIG. 6 is an oscillogram of a touch input device according to another embodiment of the present invention.

FIG. 6 is an oscillogram of the touch input device 20 according to another embodiment of the present invention. In this embodiment, during the first time duration $Td_1$ and the second time duration $Td_2$ of the second scan, the voltages $V_3$ and $V_4$ are set to equal the power supply voltage $V_{DD}$ according to the clock signal $CLK_3$ at the low logic level. The differential detection circuit 36 compares the voltages on the sensing lines $X_3$ and $X_4$ during the second time duration $Td_2$ to generate the output signal $S_{out}$. The logic circuit 302 latches the comparison signal $S_{out}$ when the second duration $Td_2$ ends regardless of the voltage level of the drive signal. That is, when the sensing line $X_3$ is touched or having a larger touched area, but the sensing line $X_4$ is not touched or having a smaller touched area, the logic circuit 302 latches a high logic level. The digital to analog converter 304 outputs a voltage lower than the power supply voltage $V_{DD}$ according to the high logic level, and the multiplexer 306 outputs an analog signal of the digital to analog converter to the capacitor 32 according to the high logic level. The capacitor 32 manifests the voltage decrease on the voltage $V_1$, so that the differential detection circuit 36 updates the comparison signal $S_{out}$, during the continuous pulse period. Accordingly, during the second time duration $Td_2$ and the continuous pulse period of the clock signal $CLK_1$, the digital to analog conversion module 30 completes an N-bit signal output.

According to the control device 200 and the specific scanning sequences provided by the present invention, before the touch panel 22 performs the second scan, the voltages on the X-directional sensing lines $X_1$ to $X_{10}$ and the Y-directional sensing lines $Y_1$ to $Y_{10}$ are not required to be reset to the first drive voltage level (the ground voltage in the example), and when the touch panel 22 performs the second scan, the voltages on the X-directional sensing lines $X_1$ to $X_{10}$ and the Y-directional sensing lines $Y_1$ to $Y_{10}$ are not required to be reset to the second drive voltage level (the power supply voltage $V_{DD}$ in the example). Because of this, the sensing speed of the touch panel 22 is dramatically increased.

Although the technical contents and features of the present invention are described above, various replacements and modifications can be made by persons skilled in the art based on the teachings and invention of the present invention without departing from the spirit thereof. Therefore, the scope of the present invention is not limited to the described embodiments, but covers various replacements and modifications that do not depart from the present invention as defined by the appended claims.

What is claimed is:

1. A control device, applied in a touch panel, wherein the touch panel comprises a plurality of first direction sensing lines and a plurality of second direction sensing lines, and the first direction sensing lines and the second direction sensing lines are arranged in a staggered manner, the control device comprising:
  a clock generation circuit, configured to generate a first clock signal and a third clock signal according to a reference clock signal, wherein a frequency of the first clock signal associates with a frequency of the reference clock signal, a frequency of the third clock signal equals half the frequency of the reference clock signal, and a phase of the third clock signal is ahead of a phase of the first clock signal;
  a selection module, configured to select sensing lines to be measured from the first direction sensing lines or the second direction sensing lines according to a predetermined scanning sequence, and also configured to output a first voltage and a second voltage according to the first clock signal;
  a drive signal generation circuit, configured to generate a drive signal according to the reference clock signal, wherein the drive signal is applied to sensing lines other than the sensing lines to be measured, the drive signal has a first drive voltage level and a second drive voltage level, and a frequency of the drive signal is half the frequency of the reference clock signal;
  a digital to analog conversion module, configured to selectively generate a third voltage or a fourth voltage according to a comparison signal, the first clock signal and the third clock signal;
  a first capacitor, coupled between the selection module and a differential detection circuit, and configured to manifest a variation of the third voltage on the first voltage;
  a second capacitor, coupled between the selection module and a differential detection circuit, and configured to manifest a variation of the fourth voltage on the second voltage; and
  the differential detection circuit, configured to detect the first and second voltages to generate the comparison signal;
  wherein the predetermined scanning sequence comprises a first scan and a second scan following the first scan; the selection module selects a first sensing line and a second sensing line, and connects the two selected sensing lines to the first and the second capacitors during the first scan; the selection module selects a third sensing line and a fourth sensing line, and connects the two selected sensing lines to the first and second capacitors during the second scan; and either (a) the first, second, third, and fourth sensing lines are arranged in sequence, or (b) the first and third sensing lines are arranged alternately, the second and fourth sensing lines are arranged alternately, and the second sensing line is adjacent to the first sensing line.

2. The control device according to claim 1, wherein the digital to analog conversion module outputs an N-bit signal, and the N-bit signal represents a capacitance variation of the touch panel.

3. The control device according to claim 2, wherein the first clock signal has a fixed time interval; each time interval comprises a first time duration, a second time duration, and continuous pulses following the second time duration; the clock generation circuit determines a length of the second time duration according to an RC time delay of the touch panel; during the time interval, the differential detection circuit completes detection of the capacitance variation; and the digital to analog conversion module completes output of the N-bit signal.

4. The control device according to claim 3, wherein the clock generation circuit generates a second clock signal to reset an input end voltage of the differential detection circuit to the drive signal during the first time duration.

5. The control device according to claim 3, wherein the control device further comprises a reset voltage selection multiplexer, the reset voltage selection multiplexer selectively outputs a power supply voltage or a ground voltage according to the third clock signal, and the input end voltage of the differential detection circuit is reset to an output voltage of the reset voltage selection multiplexer during the first time duration.

6. The control device according to claim 1, wherein the selection module comprises:
  a first multiplexer, coupled between the drive signal generation circuit and the first direction sensing lines of the touch panel, wherein the first multiplexer is configured to couple the drive signal to sensing lines other than the sensing lines to be measured according to the predetermined scanning sequence;
  a second multiplexer, coupled between the drive signal generation circuit and the second direction sensing lines of the touch panel, wherein the second multiplexer is configured to couple the drive signal to sensing lines other than the sensing lines to be measured according to the predetermined scanning sequence;

a third multiplexer, coupled between the touch panel and the differential detection circuit, wherein the third multiplexer is configured to select one of the sensing lines to be measured, and couple the selected sensing line to the differential detection circuit according to the predetermined scanning sequence; and a fourth multiplexer, coupled between the touch panel and the differential detection circuit, wherein the fourth multiplexer is configured to select the other of the sensing lines to be measured, and couple the selected sensing line to the differential detection circuit according to the predetermined scanning sequence.

7. The control device according to claim 3, wherein the digital to analog conversion module further comprises:

a logic circuit, configured to receive the comparison signal, so as to output the N-bit signal in sequence during the time interval;

a digital to analog converter, coupled to the logic circuit, so as to output an analog signal in sequence according to the N-bit signal;

a fifth multiplexer, configured to output a first set voltage or a second set voltage according to the drive signal;

a sixth multiplexer, coupled to the digital to analog converter, and configured to output the first and second set voltages to the first capacitor during the first and second time durations and configured to output the analog signal to the first capacitor according to the comparison signal and the third clock signal during the continuous pulse period; and a seventh multiplexer, coupled to the digital to analog converter, and configured to output the first and second set voltages to the second capacitor during the first and second time durations and configured to output the analog signal to the second capacitor according to the comparison signal and the third clock signal during the continuous pulse period;

wherein when the sixth multiplexer outputs the analog signal of the digital to analog converter to the first capacitor, the seventh multiplexer outputs the first or the second set voltage to the second capacitor, and when the seventh multiplexer outputs the analog signal of the digital to analog converter to the second capacitor, the sixth multiplexer outputs the first or the second set voltage to the first capacitor.

8. The control device according to claim 7, wherein during the first scan, the drive signal is transformed from the first drive voltage level to the second drive voltage level; during the first and second time durations, the third and fourth voltages are at a first set voltage level; when the second time duration ends, the logic circuit latches the comparison signal; and the latched value is used to determine whether to enable the sixth multiplexer or the seventh multiplexer to output the analog signal of the digital to analog converter.

9. The control device according to claim 8, wherein during the second scan, the drive signal is transformed from the second drive voltage level to the first drive voltage level; during the first and second time durations, the third and fourth voltages are at a second set voltage level; when the second time duration ends, the logic circuit latches a complementary signal of the comparison signal; and the latched value is used to determine whether to enable the sixth multiplexer or the seventh multiplexer to output the analog signal of the digital to analog converter.

10. The control device according to claim 8, wherein during the second scan, the drive signal is transformed from the second drive voltage level to the first drive voltage level; during the first and second time durations the third and fourth voltages are at a first set voltage level; when the second time duration ends, the logic circuit latches the comparison signal; and the latched value is used to determine whether to enable the sixth multiplexer or the seventh multiplexer to output the analog signal of the digital to analog converter.

11. A control device, applied in a touch panel, wherein the touch panel comprises a plurality of first direction sensing lines and a plurality of second direction sensing lines, and the first direction sensing lines and the second direction sensing lines are arranged in a staggered manner, the control device comprising:

a clock generation circuit, configured to generate a first clock signal and a third clock signal according to a reference clock signal, wherein a frequency of the first clock signal associates with a frequency of the reference clock signal, a frequency of the third clock signal equals half the frequency of the reference clock signal, and a phase of the third clock signal is ahead of a phase of the first clock signal;

a drive signal generation circuit, configured to generate a drive signal according to the reference clock signal, wherein the drive signal is applied to sensing lines other than at least two sensing lines to be measured in a scanning sequence, the drive signal has a first drive voltage level and a second drive voltage level, and a frequency of the drive signal is half the frequency of the reference clock signal;

a selection module, configured to select the at least two sensing lines to be measured and output a first voltage and a second voltage according to the at least two sensing lines;

the differential detection circuit, configured to receive and detect the first and second voltages to generate a comparison signal;

a digital to analog conversion module, configured to receive the comparison signal and generate a third voltage or a fourth voltage according to the comparison signal, wherein the digital to analog conversion module latches the comparison signal or a signal complementary to the comparison signal when the scanning sequence ends;

a first capacitor coupling between the digital to analog conversion module selection module and an input of the differential detection circuit, and configured to manifest a variation of the third voltage on the first voltage; and a second capacitor, coupled between the digital to analog conversion module selection module and an input of the differential detection circuit, and configured to manifest a variation of the fourth voltage on the second voltage, wherein the first capacitor and the second capacitor manifest the variation of the third voltage and the fourth voltage so that the differential detection circuit updates the comparison signal.

* * * * *